April 14, 1970   D. R. DEWEY, JR., ET AL   3,506,332
AIR TO WATER VIEWING DEVICE
Filed Aug. 15, 1966

INVENTORS
DAVIS R. DEWEY, II,
ROBERT B. GALLIPEAU
BY
Morse, Altman & Oates
ATTORNEYS

United States Patent Office 3,506,332
Patented Apr. 14, 1970

3,506,332
AIR TO WATER VIEWING DEVICE
Davis R. Dewey, Jr., 1 Old Winter St., Lincoln, Mass. 01773, and Robert B. Gallipeau, Groton, Mass.; said Gallipeau assignor to said Dewey
Filed Aug. 15, 1966, Ser. No. 572,273
Int. Cl. G02b 21/00, 23/00
U.S. Cl. 350—54                              4 Claims

ABSTRACT OF THE DISCLOSURE

An air to water viewing device comprises a water-tight elongated tubular casing having a forward end and a rearward end, field lens means within the casing at the forward end, eye lens means within the casting at the rearward end, relay lens means within the casing medially between the forward end and the rearward end, the average density of the device being less than 1.0, the center of gravity of the device being positioned between the forward end and a point midway between the forward end and a point midway between the forward end and the rearward end, the device being such as to provide an observer of an underwater scene with a wide angle viewer that tends to retain its stability during manipulation and that precludes inadvertent loss by floating following inadvertent release.

---

The present invention relates to air-to-water viewing devices to be used by fishermen, sportsmen and naturalists while afloat, for the observation of under waterscape. The "glass bottom bucket" (having a broad glass window at the bottom of an open top, bucket-like configuration), which traditionally has been used for the foregoing purpose, as a practical matter, has been characterized by: a narrow field of view because of difficulty encountered by a user in positioning his head close to the window, no magnification so that the only visual problem remedied is uneven refraction at the surface of the water; and insecure manipulative control because of undue bouyancy which tends to prevent maintenance in any desired hand held position and orientation.

The primary object of the present invention is to provide a novel air-to-water viewing device; which is characterized mechanically by an elongated, hermetically sealed casing that is water-tight, an overall density of less than 1 so that the device floats rather than sinks and a center of gravity forward of its axial center so that the rearward extremity of the device tends to project out of the water; and which is characterized optically by a wide angle objective having a large depth of field for providing a primary image, an optical relay capable of receiving and transmitting the primary image to provide a secondary image and a wide angle eyepiece capable of permitting the secondary image to be viewed as a magnified image by an observer.

Other objects of the present invention will in part be obvious and will in part appear hereinafter.

The invention accordingly comprises the components and parts which are described in the following disclosure, the scope of which will be indicated in the appended claims. For a fuller understanding of the nature and objects of the present invention, reference should be had to the following detailed description, taken in connection with the accompanying drawing, wherein:

FIG. 1(a) is an accessory for the air-to-water viewing device of FIG. 1;

Figure 1:
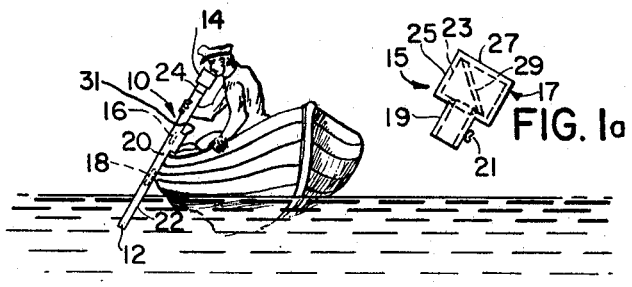
FIG. 1 is a pictorial view of the air-to-water viewing device of the present invention, in use.

The illustrated air-to-water viewing device is shown at 10 in FIG. 1 as comprising a tubular casing approximately 3 inches in maximum diameter and approximately 2 feet long. As shown, the device is in the form of an elongated barrel having a forward field lens 12 and a rearward eye lens 14, both having wide angle characteristics. Within the casing is a relay lens 16, which acquires the wide angle primary image produced by field lens 12 for presentation as a wide angle secondary image to eye lens 14. The design of the relay lens governs the length of the device which may range from 1 to 5 feet. Also within the casing is an annular weight 18 by which the balance of the device is adjusted so that the overall center of gravity, shown at 20, is disposed between the axial center and the forward end of the casing. The overall density of the device is within the range of from 0.6 to 1.0. The readward part of the casing is coated with a daylight fluoroescent paint that constitutes a visual marker. In consequence of the lighter-than-water density and the forwardly positioned center of gravity, the device avoids undue buoyancy that would tend to hinder control of orientation and precludes inadvertent loss by exposing a brightly visible fluoroescent marker when floating following inadvertent release. In order that the casing not attract undesirable attention from underwater life, the major portion of the casing is coated with a dull black finish at at 22. A bracket 31 is provided for affixing the device to a spear gun or the like for use as a telescopic sight. As shown in FIG. 1(a), a single lens reflex camera 15 is provided as an accessory. This camera includes a housing 17 having a forwardly projecting barrel 19 which receiver eyepiece 14, to which it may be locked by a wing nut 21. This camera includes an objective lens 23, a film holder 25, a ground glass viewing screen 27 and a beam splitter 29 for directing images both to film holder 25 and viewing screen 27.

Figure 2:
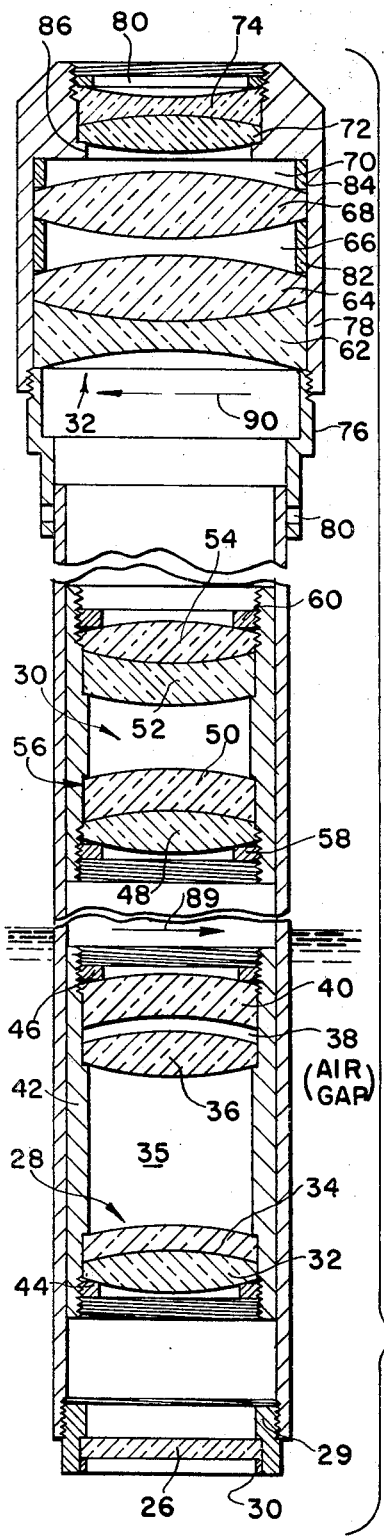
FIG. 2 is a cross sectional view of the viewing device of FIG. 1, illustrating details thereof.

Generally, FIG. 2 shows details of field lens 12, relay lens 16 and eye lens 14. Field lens 12 includes a front window and seal 26 and a Petzval type objective 28. Window 26 is a glass disc, having planar forward and rearward faces, which is positioned against a shoulder of an annular mount 29 and which is retained by a resilient ring 30. The rearward exterior of mount 29 is threaded and turned into the internally threaded forward extremity of the tubular casing. Petzval objective 28 includes a forward duplet, having a double convex lens 32 and a forwardly concave meniscus lens 34, an air gap 35, and a rearward triplet having a double convex lens 36, an air gap 38 and a forwardly concave meniscus lens 40. Duplet 32, 34 and triplet 36, 38, 40 are positioned at the forward and rearward inner shoulders of an annular mount 42, which is press fitted into the tubular casing. The duplet and the triplet are retained by externally threaded rings 44, 46, which are turned into corresponding internally threaded extremities of mount 42. Relay lens 30 includes a pair of symmetrically orineted duplets, the forward one of which includes a double convex lens 48 and a forwardly concave meniscus lens 50 and the rearward one of which includes a rearwardly convex meniscus lens 52 and a double convex lens 54. These duplets are positioned by the forward and rearward inner shoulders of an annular mount 56 and retained by externally threaded rings 58, 60, which are turned into corresponding internally threaded extremities of mount 56. Eye lens 32 includes, in sequence, a double concave lens 62, a double convex lens 64, an air gap 66, a double convex lens 66, an air gap 70, a double convex lens 72 and a double concave lens 74. These lenses are positioned within a shouldered annular mount having a forward part 76 and a rearward part 78. Forward part 76 is bolted to the rearward extremity of the tubular casing at 80. Rearward part 78 is internally threaded at its forward extremity and turned onto the externally threaded rearward extremity of forward part 76. Lenses 62, 64 are positioned in contact with each other between a shoulder presented by forward part 76 and a ring 82 that is press-fitted into rearward part 78. Lens 68 is positioned between ring 82 and a ring 84 which is press-fitted into rearward part 78. Lenses 72, 74 are positioned between a shoulder 86 at the interior of rearward part 78 and an externally threaded ring 88, which is turned into the internally threaded extremity of rearward part 78.

The optical arrangement of FIG. 2 is such that field lens 28 forms an inverted and reverted primary image at 88 and relay lens 30 forms a secondary image at 90. The secondary image is a real image, bearing the proper azimuthal relationship to the original target. Eye lens 32 magnifies the secondary image for presentation to the observer. As a practical matter in the foregoing system, it is desired that the focus be fixed since focal adjustment would be impractical under ordinary conditions of use. The foregoing relationships among the wide angle field lens, the intermediate relay lens and the wide angle eye lens achieve, with fixed focus, a depth of field that is commensurate with an underwater field which normally is limited by turbidity, light absorption and light scattering. The object distance is relatively close, i.e. approximately from 3 feet to 40 feet. The Petzval type objective, by virtue of the presence of the relay, may be characterized by an extremely short focal lens that inherently provides the greatest depth of field for the entire device.

Figure 3:
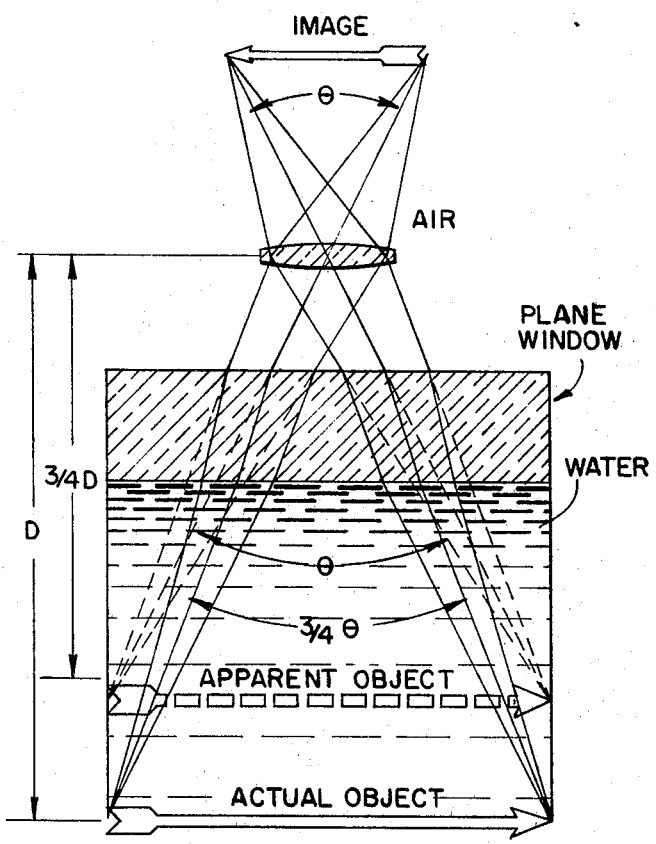
FIG. 3 is a diagram illustrating certain principles of the optical system of the viewing device of FIG. 1.

The design of the field lens is governed by the fact that the forward end of the device is immersed in water. Ordinarily the viewing angle should be comparable to the normal viewing angle of the human eye which is about 57°. However, due to the underwater medium, the tendency of the optics is to reduce the angular field coverage of the system. FIG. 3 illustrates the basic geometrical optics of a conventional lens in combination with a plane parallel window in contact with water. Light rays emanating from the object pass through the water and are refracted initially at the water-glass interface, are refracted again at the glass-air interface and then impinge on the field lens. From the viewpoint of the lens, the rays appear to be coming from an apparent object that is equal in size to the actual object but (it may be shown) that is located at ¾ the distance to the actual object. This distance condition naturally extends the angular field of view from ¾ θ in object space to θ in image space. Obviously, therefore, for lens systems covering the same physical object field, a water lens must be capable of covering a larger field angle than an air lens. Also, the lens must be focused at ¾ the distance to the actual object. In other words, the distance condition naturally extends the angular field of view from ¾ θ in object space to θ in image space. Also, the factor ¾ is the reciprocal of the index of refraction of the water medium (for small angles of θ). Thus the relationship between the field angle of the field lens and the field angle of the eye lens is such that the field angle of the eye lens need only be approximately ¾ the field angle of the field lens.

The present invention thus provides associated mechanical and optical features that make possible an underwater viewing device characterized by an unprecedented combination of efficacy and simplicity. Since certain changes may be made in the foregoing device without departing from the scope of the invention herein, it is intended that all matter described in the foregoing specification and shown in the accompanying drawing be interpreted in an illustrative and not in a limiting sense.

What is claimed is:

1. An air to water viewing device comprising an elongated, water-tight tubular housing having a forward end and a rearward end, field lens means at said forward end, eye lens means at said rearward end, relay lens means between said field lens means and said eye lens means, the average density of said device ranging from 0.6 to 1.0, the center of gravity of said device being positioned between said forward end and a point midway between said forward end and said rearward end, a window at said forward end, said field lens means comprising in sequence a double convex lens, a forwardly concave meniscus lens, an air gap, a double convex lens, an air gap and a forwardly convex meniscus lens, said relay lens means including in sequence double convex lens, a forwardly concave meniscus lens, an air gap, a forwardly convex meniscus lens and a double convex lens, said eye lens means including in sequence a double concave lens, a double convex lens, an air gap, a double convex lens, an air gap, a double convex lens and a double concave lens, the field angle of said eye lens means being a predetermined fraction of the field angle of said field lens means.

2. The viewing device of claim 1 wherein said field lens is of the Petzval type.

3. The viewing device of claim 1 wherein said field angle of said eye lens means is approximately ¾ of the field angle of said field lens means.

4. An air to water viewing device comprising an elongated tubular casing having a forward end and a rearward end, objective lens means at said forward end, eye lens means at said rearward end and relay means between said objective lens means and said eye lens means, said objective lens means being of wide angle design such that the field angle of said eye lens means is approximately ¾ of the field angle of said objective lens means, said relay lens means acquiring a primary image from said objective lens means and presenting a real image to said eye lens means, the average density of said device being less than 1.0 so that a part of said device extends from water in which remaining parts are immersed, ballast means positioned forwardly of the point midway between the forward and rearward extremities of said device in order to position the center of gravity of said device definitively at a point forwardly of a point midway between the forward and rearward extremities of said device, whereby manipulation of said device in water is convenient from a position out of said water and the rearward extremity projects out of said water inherently when said device is floating freely in said water, said objective lens means, said relay lens and said eye lens means each including a plurality of lens elements whereby the image presented to the eye of a user is well corrected.

References Cited

UNITED STATES PATENTS

| 1,451,096 | 4/1923 | Hagen | 350—179 |
| 1,436,226 | 11/1922 | Alschuler | 250—71 |
| 1,484,853 | 2/1924 | Warmisham | 350—231 |
| 2,698,555 | 1/1955 | McCarthy | 350—54 |
| 2,968,208 | 1/1961 | Shaw | 350—52 |
| 3,092,852 | 6/1963 | Devereux | 9—8 |
| 3,167,793 | 2/1965 | Keats | 9—8 |

FOREIGN PATENTS 314,467   1/1934   Italy.

OTHER REFERENCES

Ivanoff et al.: JSMPTE, vol. 69, April 1960, pp. 264–266; "Correcting Lenses For Underwater Use."

Gregg: Optometric Weekly, vol. 52, July 13, 1961, pp. 1381–1385, "Visual Problems of Skin Diving."

PAUL R. GILLIAM, Primary Examiner

U.S. Cl. X.R.

9—8; 114—66; 350—69